No. 764,824. PATENTED JULY 12, 1904.
D. C. RUTH.
SELF FEEDER FOR THRESHING MACHINES.
APPLICATION FILED NOV. 27, 1901.
NO MODEL. 5 SHEETS—SHEET 4.
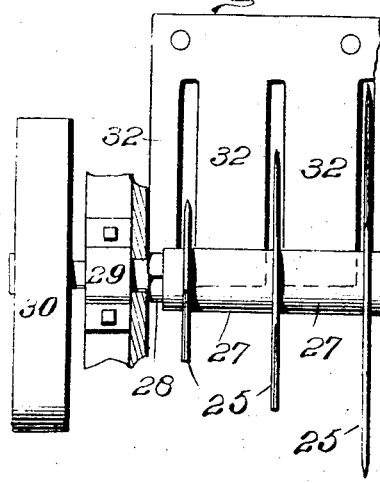
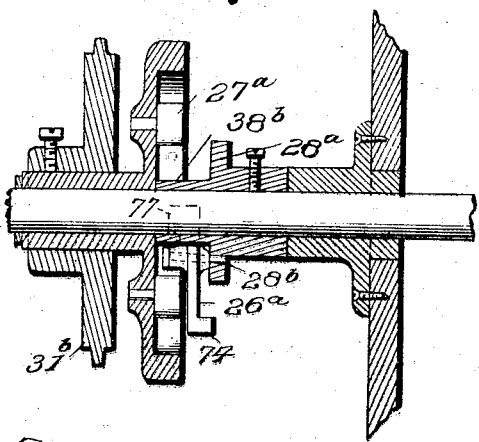
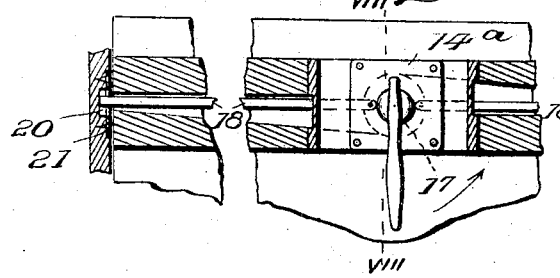
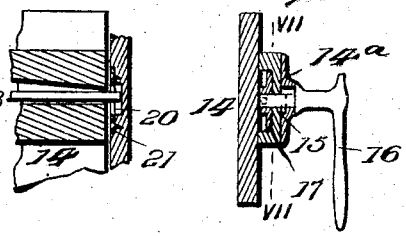
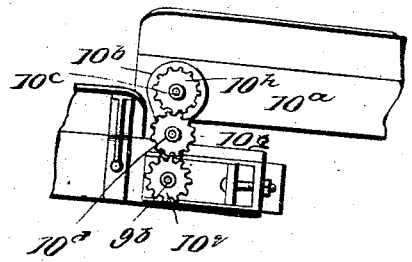
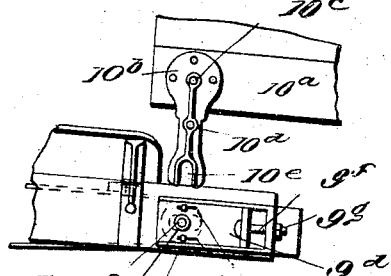
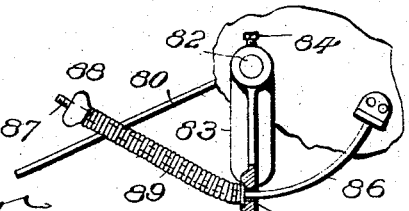
Witnesses:
Harry A. Knight
Inventor:
David C. Ruth
By Knight Bros.
Attorneys

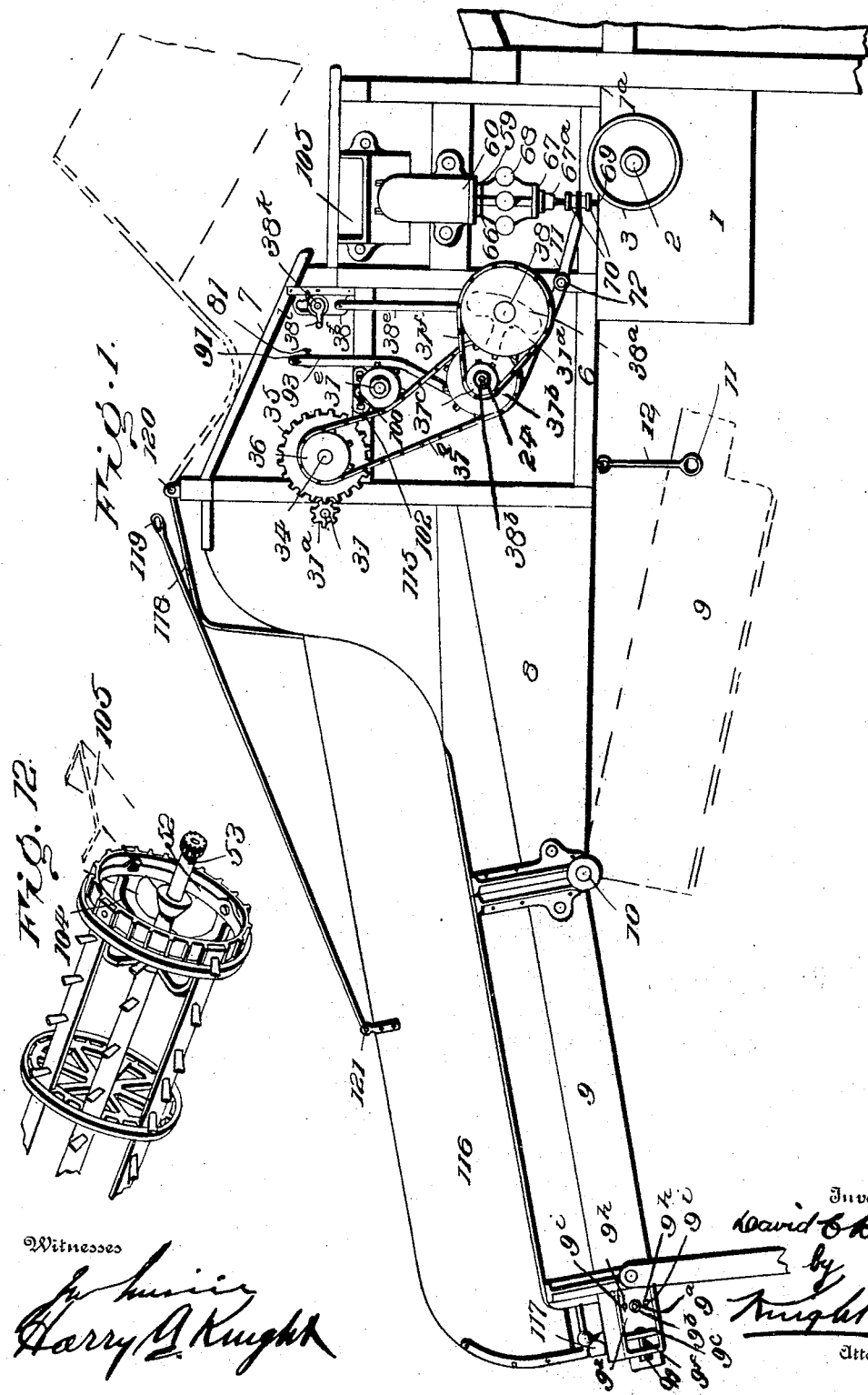

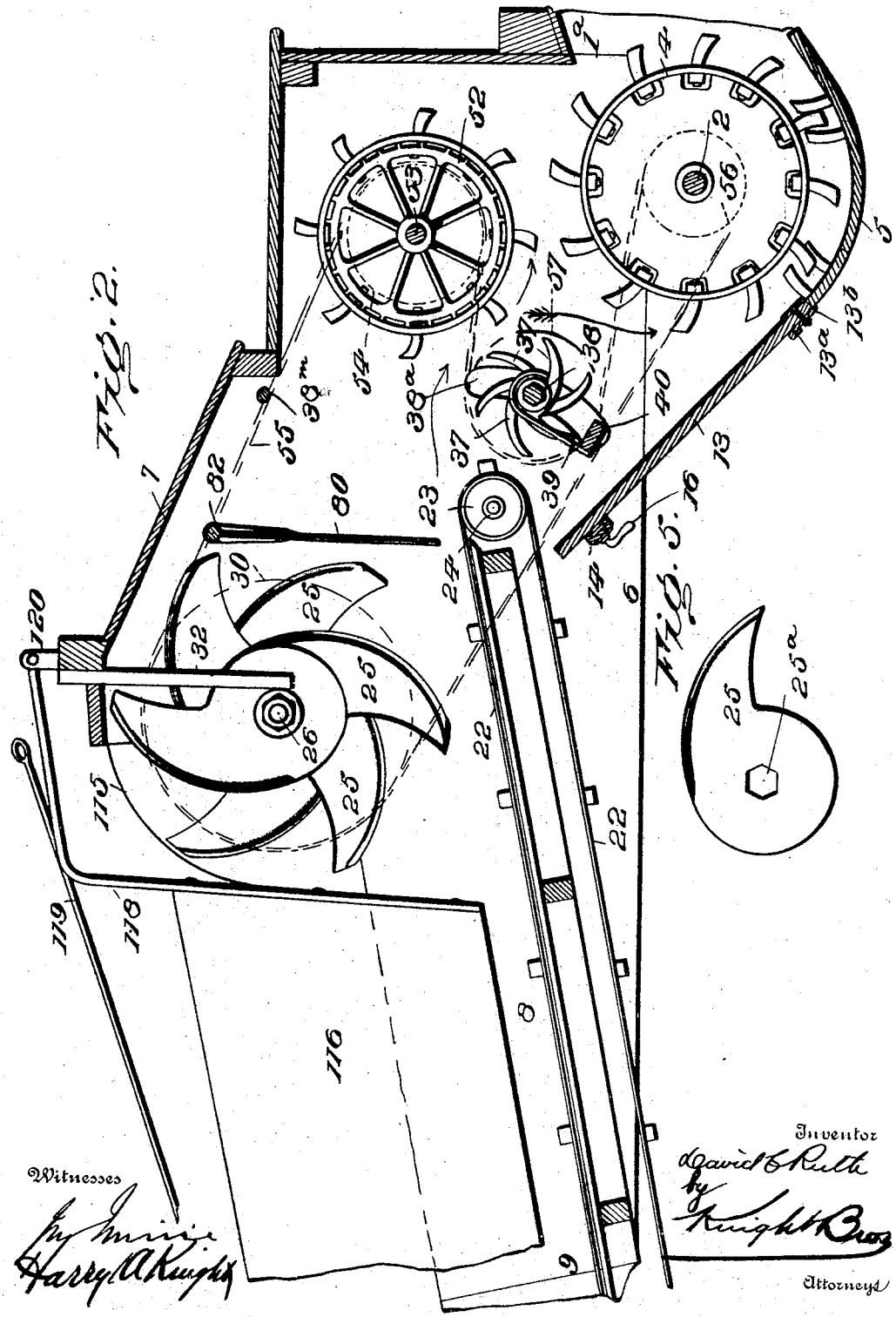

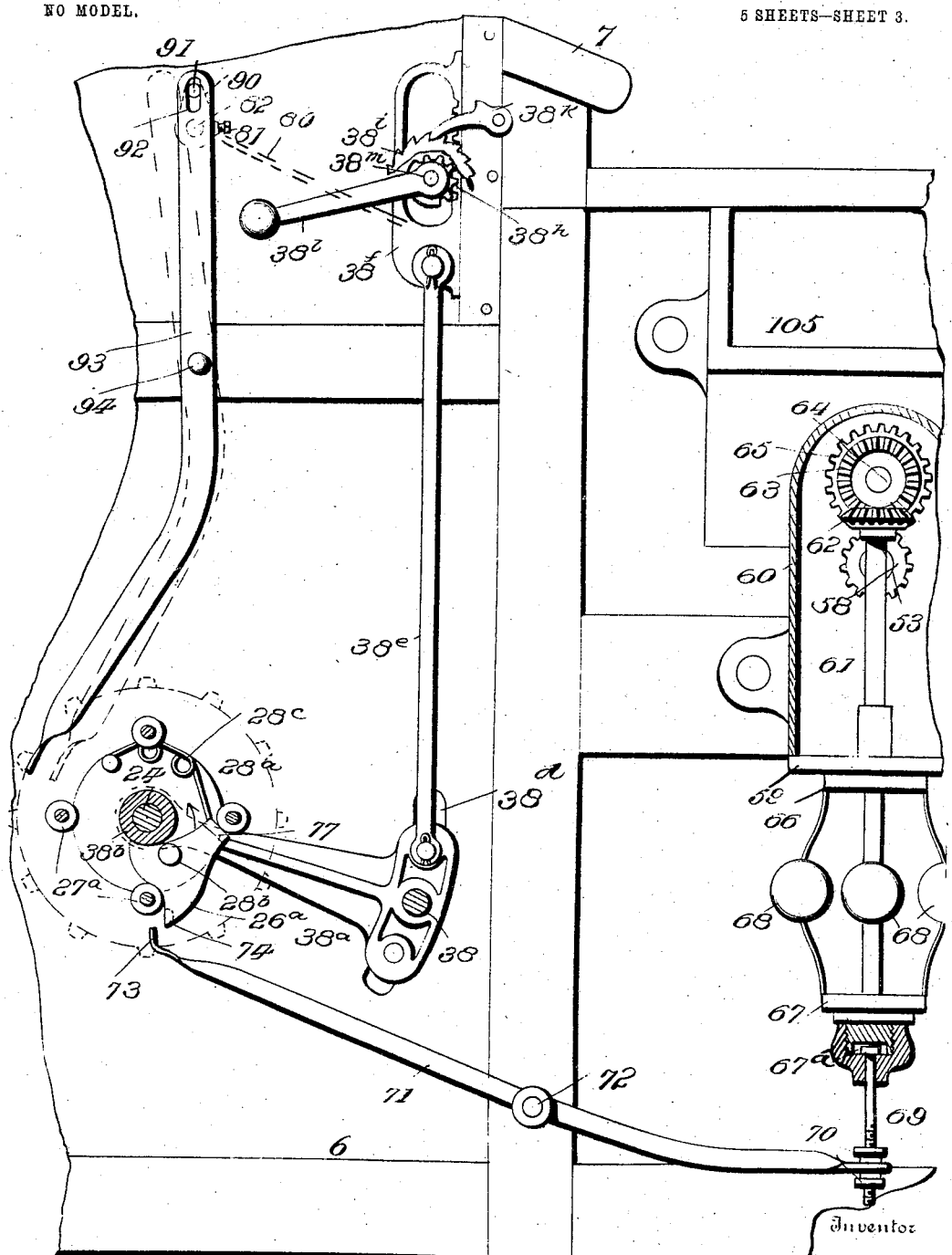

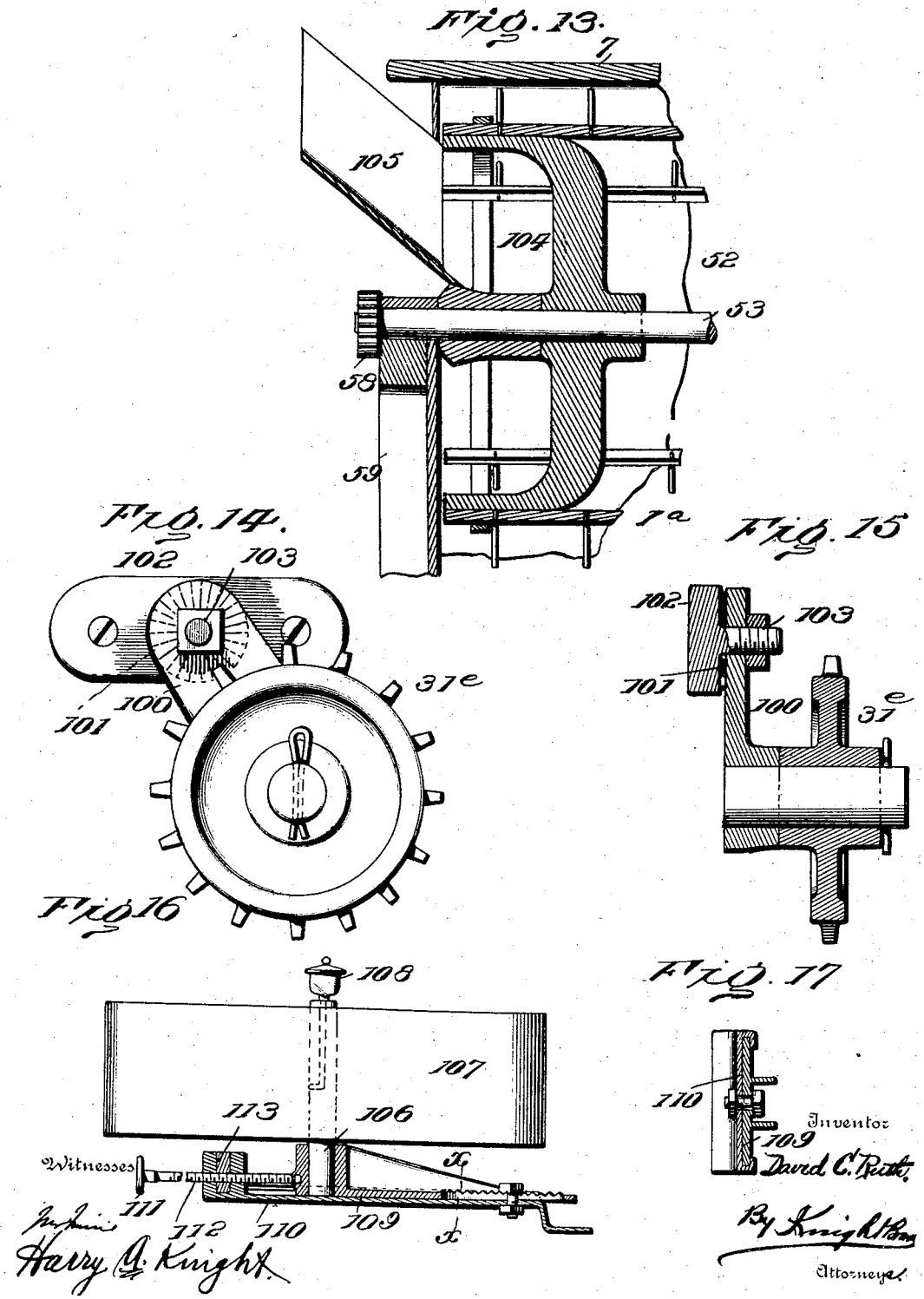

No. 764,824.

Patented July 12, 1904.

UNITED STATES PATENT OFFICE.

DAVID C. RUTH, OF HALSTEAD, KANSAS, ASSIGNOR OF ONE-HALF TO MENNO S. HEGE AND GUSTAVUS A. HEGE, OF HALSTEAD, KANSAS.

SELF-FEEDER FOR THRESHING-MACHINES.

SPECIFICATION forming part of Letters Patent No. 764,824, dated July 12, 1904.

Application filed November 27, 1901. Serial No. 83,888. (No model.)

*To all whom it may concern:*

Be it known that I, DAVID C. RUTH, a citizen of the United States, and a resident of Halstead, in the county of Harvey and State of Kansas, have invented certain new and useful Improvements in Self-Feeders for Threshing-Machines, of which the following is a specification.

My invention relates to self-feeders for threshing-machines.

The object of my invention is to produce a machine of this character in which the volume of straw passing to the cylinder is arrested and automatically separated and regulated. The bundles of straw passing into the machine are after the bands are cut thoroughly separated before reaching the concave of the threshing-cylinder, this being accomplished by means of a feeder (or feeding) cylinder which in construction resembles the cylinder commonly used in a threshing-machine, the advantage of which over all other feeding devices consists in its weight and speed, whereby an effective momentum is stored, giving the feeder-cylinder an efficiency in combing out the straw which is impossible in any other device. The feeder-cylinder revolves at a high rate of speed in the same direction as the threshing-cylinder, while the retarder of the feeder runs at a low speed and in a direction opposite to that of the feeder-cylinder and the threshing-cylinder, the relative position of the feeder-cylinder, the threshing-cylinder, and retarder being such that the bundle or mass of straw to be separated must pass over the retarder as the same is taken hold of by the feeder-cylinder and by it distributed to the threshing-cylinder, and the latter, in conjunction with the action of the retarder and feeder-cylinder, completes the separation before it reaches the concave of the threshing-cylinder. The retarder thus enhances the movement, together with the bundle-carrier, toward the threshing-cylinder and at the same time controls the movement of the mass by retarding the lower part, while the top is combed out and swept forward by the action of the feeder-cylinder and threshing-cylinder, thus spreading out the grain endwise instead of sidewise, as in other feeders, all parts having a rotary motion.

A further object of my invention is to provide means for raising and lowering the retarder while in motion, so as to enlarge or diminish the space between it and the feeder-cylinder and the threshing-cylinder to meet the demands of various conditions of grain; and with these objects in view my invention consists of the parts and combination of parts, as will be more fully hereinafter pointed out.

In the drawings, Figure 1 is a side elevation of a threshing-machine embodying my invention. Fig. 2 is a vertical longitudinal section of the same. Fig. 3 is a side elevation of the threshing-machine broken away with means for controlling the feeder. Fig. 4 is a detailed sectional view of the feeder-frame, outer band wheel and cutter, and the shaft on which the same is mounted. Fig. 5 is a detailed view of one of the band-cutter knives. Fig. 6 is a detail section showing the clutch for the carrier. Fig. 7 is a sectional view taken on the line VII VII, Fig. 8. Fig. 8 is a transverse section on the line VIII VIII, Fig. 7. Fig. 9 is a side elevation of the outer end of the carrier-frame and its extension with gearing in position. Fig. 10 is a view similar to Fig. 9 with parts detached and gearing removed. Fig. 11 is a side elevation of additional mechanism for regulating the movement of the carrier. Fig. 12 is a perspective view of the feeding-cylinder. Fig. 13 is a detailed view showing means for feeding in the tailings from the threshing-machine. Figs. 14 and 15 are a side and a sectional view, respectively, showing the chain-tightener. Fig. 16 is a sectional detailed view of the belt-tightener; and Fig. 17 is a section on the line X X, Fig. 16.

1 designates the front end of the threshing-machine, formed with a right-angled recess 1ᵃ above the shaft 2, upon one end of which is a drive-pulley 3, and mounted upon said shaft in the usual manner is the threshing-cylinder 4. 5 is the customary concave below the cylinder.

Referring now to the feeder, 6 designates the feeder-frame, secured at its rear end directly above the threshing-cylinder in the recess 1ª and projecting forwardly from the thresher only about twenty inches, where ordinarily feeder-frames project from three to five feet. This construction brings more of the weight of the feeder directly upon the thresher. The feeder-frame embraces the customary quadrant or hooded portion 7 and the forwardly-projecting lower portion or carrier-frame, comprising the stationary portion 8, the movable portion 9, hinged at 10 to the portion 8 and adapted to be folded under the latter for convenience in transportation. The portion 9 near its free end has outwardly-projecting pins 11, (only one of which appears,) adapted to be engaged by links 12, suspended from the feeder-frame for the purpose of holding the carrier-frame in its inoperative position for transportation, &c. Said portion also has at each side a bearing $9^a$, having its outer shaft $9^b$ adjustably secured in slots (see Fig. 1) of the frame, said bearing being cast with plate $9^d$. Each plate $9^d$ is mounted slidingly in a frame $9^e$ and is adjusted by means of the bolt $9^f$ and the nut $9^g$ mounted thereon. Each plate $9^d$ is also provided with slots $9^h$, engaging guide-bolts $9^i$ of portion 9. By means of these slide-plates it is obvious that the outer shaft may be adjusted to tension the carrier to the degree desired.

The carrier-frame 8 and 9 is provided with a removable extension-carrier $10^a$, and secured to said extension $10^a$ is a pair of depending plates $10^b$, in which is journaled the inner shaft $10^c$ of said extension-carrier. (See Fig. 10.) One of the plates $10^b$ is also provided with a stub-shaft $10^d$, and the lower ends of said plates are formed with forks $10^e$ to fit over the bearings $9^b$ of said portion 9. An idler or power-transmitting gear $10^f$ is journaled on stub-shaft $10^d$ and meshes continuously with the gear-wheel $10^g$, of shaft $9^b$, and gear $10^h$ of shaft $10^c$, whereby movement is imparted to the extension-carrier in the direction traversed by the lower carrier. To throw the extension-carrier out of gear with the main carrier, it is only necessary to raise the inner or rear end of the extension-frame $10^a$, thereby withdrawing gear-wheel $10^h$ and idler gear-wheel $10^g$ and the forks $10^e$ over bearing $9^a$, as shown in Fig. 10.

13 designates the inclined feed-board extending obliquely from the near end of the carrier-frame portion 8 down upon concave 5, the lower end of said board having a cross-plate $13^a$ at its outer side and one or more pairs of plates $13^b$ to fork over the upper edge of the concave, and thereby maintain the feed-board in a proper position. At the outer side of the board near its upper end is a cross-strip 14, carrying a central plate $14^a$. A journal for the shaft 15 extends through the strip and is provided with a handle 16 at its outer end and with a disk 17 at its inner end fitting in a recess in the strip. (See Fig. 8.) Pivotally secured to said disk at diametrically opposite points are locking slide-rods 18, occupying grooves in the strip (see Fig. 7) and having their outer ends projecting into elongated holes or recesses 20 in the inner sides of the feeder-frame, said recesses being relieved of wear and contact with said rods by the wear-plates 21, as shown clearly in Fig. 7. The holes or recesses 20 are elongated for the purpose of accommodating a slight longitudinal adjustment of the concave in a well-known manner.

22 designates the customary endless carrier, adapted to be mounted at its outer end on shaft $9^b$ and at its inner end on belt-pulleys 23, secured on shaft 24 over the upper end of the feed-board.

The rotary band-cutter is composed of a series of knives or projecting curved plates 25, having a six-pointed-star-shaped or hexagon hole $25^a$ in the center in order that the knives may be set at six different angles upon the hexagon shaft 26. The six knives preferably employed to set the cutter are separated by sleeves or collars 27 upon the shaft and are clamped radially in position by means of suitable jam-nuts 28 upon threaded portions of the shaft. (See Fig. 4, one jam-nut being shown.) The shaft is journaled in brackets 29, secured to the feeder-frame, and carries at one end a belt-pulley 30 and at its opposite end a small gear-pinion 31.

To prevent the grain being wound upon the band-cutter shaft by stripping it from the revolving knives, a guard is provided consisting of a series of iron or metal lined wood strips 32, secured at their upper end to the frame, one of these strips fitting snugly between each pair of knives of the cutter, as indicated in Fig. 4.

37 designates the rotary grain-retarder of substantially the same construction as the band-cutter and located rearward of the carrier and above the feed-board, said rotary grain-retarder being mounted on shaft 38, journaled in casting $38^a$, said casting being journaled around the journal $38^b$ of the carrier-shaft, said casting and the retarder-shaft being movable up and down in the slot $38^d$, formed in the sides of the machine, as best seen in Fig. 3. $38^e$ is a rod one end of which is pivotally secured to the upper end of the casting. $38^f$ is a rack secured to the sides of the frame of the machine, to which the upper end of the rod $38^e$ is pivotally secured. $38^h$ is a pinion adapted to mesh with the rack bar or rod $38^e$, and $38^j$ is a ratchet carried by said pinion. $38^k$ is a dog adapted for engagement with the ratchet-wheel $38^i$, and $38^l$ is an operating-handle secured to the pinion $38^h$, by means of which the pinion is revolved to elevate the rack-bar $38^f$, whereby raising the casting $38^a$ and retarder-shaft 38 by means of the rod $38^e$. Thus through the shaft $38^m$ both ends of the retarder-shaft are raised simultaneously. By the mechanism used it turns very slowly and is automatic in its movement, stopping or starting with the action of the governor described elsewhere. Its location is just at the upper end of the grain-carrier, and it is adjustable toward and from the feeder-cylinder to suit the kind and condition of grain and power at command, as by the increased or decreased space between the retarder and feeder-cylinder this feature is obtained. Being just below and slightly forward of the feeder-cylinder (which runs at a high speed) and turning in an opposite direction to the feeder and thresher cylinder, it receives the grain from the carrier in its passage to the thresher-cylinder, the lower portion of the bundles after the band is cut being arrested in its movement, admitting only of its slow progress, while the top is instantly and thoroughly combed out, thus delivering the grain in an even flow and disintegrated state to the thresher-cylinder, a feature found in no other machine, as the close proximity of the retarder and the feeder-cylinder and their action must absolutely produce this result. 34 is a stub-shaft projecting from the feeder-frame, and journaled thereon is a gear-wheel 35, meshing with cog 31. A sprocket-wheel 36 is cast with or secured to the gear-wheel 35. $31^a$ is a pinion on the cutter-shaft, with which the intermediate gear-wheel 35 meshes, said gear-wheel being provided with the integral sprocket-wheel 36, above referred to. $31^b$ is a sprocket-wheel mounted on the carrier-shaft, on which the clutch illustrated in Fig. 6 is mounted, and $31^c$ is a small sprocket-wheel secured on the carrier-shaft 23. $31^d$ is a large sprocket-wheel fast on the shaft of the retarder, and $31^e$ is a chain or belt tightener suitably hung to the frame of the machine. $31^f$ is a chain for driving the carrier-shaft. $31^g$ is the chain for driving the retarder. This retarder 37, like the band-cutter, is provided with a comb secured to the cross-bar 40 and adapted to prevent the entanglement of the grain with the retarder and the consequent imperfect operation of the machine. By this arrangement it is obvious that motion imparted to the band-cutter imparts motion to the carrier and the grain-retarder in the direction indicated by the arrows, Fig. 2, and that the gearing employed has a connection between these parts which reduces approximately to four hundred and fifty revolutions per minute of the band-cutter to about from sixty to one hundred and twenty revolutions per minute of the carrier-shaft and about twenty-three revolutions per minute of the grain-retarder, though it is obvious that these proportionate speeds need not be adhered to.

About vertically above the threshing-machine cylinder and slightly above the plane of shafts 24 and 38 is the rotary feeder-cylinder 52, the same being mounted radially on shaft 53, journaled in a feeder-frame and carrying at one end a belt-pulley 54, connected by an endless belt 55 with the cylinder-belt 56 and band-cutter pulley $30^e$, said belt being caused to engage more than half of the peripheries of pulleys $30^e$ and 56 by the interposition of the idler-pulley 57, mounted on the stub-shaft of belt-tightener frame. (See Fig. 2.)

Assuming that the cylinder of the threshing-machine is making twelve hundred revolutions per minute, this causes a speed of about four hundred and fifty revolutions per minute of the band-cutter and about eight hundred and eighty-five revolutions per minute of the feeder-cylinder, which acts in conjunction with the relatively slowly moving grain-retarder in a manner and for a purpose which is hereinafter explained.

A governor geared to the cog-pinion 58 is secured on the opposite end of shaft 53 from the pulley 54 and is constructed as follows: 59 designates a bracket carrying the governor secured to the outside of the feeder-frame and provided with a hood 60. 61 is a vertical shaft journaled in said bracket provided with a beveled cog 62 at its upper end meshing with a beveled cog 63, journaled upon stub-shaft 64, projecting from the hood, a cog-wheel 65, secured to or cast with beveled cog 63, meshing with and receiving movement from the pinion 58. 66 is a collar secured to rotate with shaft 61, and 67 a sliding collar connected to the collar 66 by the weighted arms 68. A nut $67^a$ is screwed upon collar 67, and swiveled in said nut is a bolt or stem 69, having nuts 70 thereon. The rotary movement of the shaft through centrifugal action causes the weighted arms to swing inward or outward, accordingly as the speed diminishes or increases, and thereby depresses or elevates the collar 67 in the customary manner. This reciprocatory action of the collar imparts oscillatory movement to the trip-lever 71, fulcrumed, as at 72, to the stem feeder-frame, one end of said lever being secured to the stem 67 between the nuts 70, and the other end is given a slight upward bend, terminating in the upwardly-projecting arm 73, adapted to operate the trip-dog $26^a$, whereby the dog is thrown into or out of the path of the rollers $27^a$. $28^a$ is a hub on which the dog is mounted by means of the pivot $28^b$, said hub being suitably mounted on the carrier-shaft. $28^c$ is a spring for holding the trip-dog $26^a$ in the line of the travel of the rollers $27^a$. The arm 73 when the speed-cylinder is too slow for efficient operation projects into the path of the inwardly-projecting arm 71 of dog $26^a$, pivoted upon a collar or enlargement of shaft 24. The dog is also provided with an outwardly-projecting arm 77, adapted normally to be held by the spring $28^c$, secured to the collar or enlargement in the path of the rollers 27ª, carried by the disk 28ª, journaled upon the shaft 24, as hereinbefore explained, in order that the continuous rotation of said disk may revolve the carrier-shaft 24 at a corresponding speed. When, however, the speed of the cylinder falls below that necessary for effective operation and the governor raises lever-arm 71 into the path of arm 73 of dog 74, the resistance of spring $28^c$ is overcome and the dog is pivotally projected in the direction indicated by the arrow, Fig. 3, until its arm is moved out of the path of rollers 27ª, thereby arresting the movement of the carrier-shaft without interfering with the continued rotation of disk 28ª and the connected parts. The inaction of shaft 24 continues until the cylinder attains the required speed, and the governor therefore withdraws lever-arm 73 from the path of the dog-arm 74 and permits spring $28^c$ to again throw the dog outward and dispose arm 77 in the path of the rollers, one of which strikes said arm and sets the carrier in operation.

80 designates a gate composed of sheet-iron arranged just above and between the delivery end of the carrier and the grain-retarder, said gate being secured by a set-screw 81 at the desired angle upon a rock-shaft 82, journaled in the feeder-frame, this gate being adapted to swing back and up to accommodate the flow of the straw and drops to its natural position, preventing flying grain from being thrown outside when no straw is passing, as the grain is fed by the carrier and band-cutter upon the rotary feed-cylinder 52, and in order to automatically prevent an overcharge being delivered to and between said retarder and feeder the following construction is provided—that is to say, 83 designates an arm secured by set-screw 84 at the desired angle on one end of shaft 82 and provided with a roller 85, through which concentrically extends a guide-rod 86, secured to the feeder-frame at its front end and provided with screw-threads 87 at its rear end engaging by the adjusting-nut 88 for the spiral spring 89, mounted upon the rod between said nut and arm 83, said spring tending to force said arm forward, and thereby present a yielding resistance to the backward movement of the gate for a certain distance—that is to say, sufficiently far to permit a regular charge of grain to pass beneath and beyond it. In case the carrier takes an overcharge the additional pressure thereby brought against the gate will cause the spring to yield sufficiently to stop the carrier until the surplus is disposed of, this action being brought about by the following mechanism: 90 is a short crank (shown in dotted lines in Fig. 3) secured upon the end of shaft 82 corresponding to the location of dog 26ª, and 91 a pin projecting from said crank-arm engaging longitudinally slot 92 in the outer end of the rock-lever 93, fulcrumed, as at 94, on the feeder-frame and having its lower end adapted to be thrown into the path of arm 74 or dog 26ª to arrest the movement of the latter, and consequently the carrier, as the excessive pressure, as above referred to, is brought upward against the gate 80. Under the slight oscillatory movement of the gate, which of course is frequent in actual practice, the lower end of lever 93 vibrates toward and from the path of dog-arm 74, and when the gate is moved the necessary distance by the excess of pressure above referred to the crank-pin 91, connecting the slot 92, of course throws the upper end of the lever a sufficient distance for the gate to dispose its lower end in the path of the dog, as indicated by dotted lines, Fig. 3. It will thus be seen that it is practically an impossibility to choke the cylinder by an overcharge of feed, for the reason that the carrier cannot deliver grain to the cylinder at all until the latter has attained the proper speed for effective operation and for the further reason that an overcharge of grain fed by the carrier results in the stopping of the carrier and holding it inactive until the surplus grain has been disposed of. By using a larger or smaller sprocket-wheel 36 the speed of the carrier is changed at will. This wheel is, as stated, secured to the hub of the intermediate gear by means of a set-screw.

The chain-tightener $31^c$ is carried on an arm 100, which is provided with a serrated face 101, the base 102 also having a serrated portion with which the serrated face 101 of the arm is adapted to mesh, the base being bolted fast to the feeder-frame. It will thus be seen that the arm 101 may be swung back and forward to loosen or tighten the chain, as desired, and held in position by the set-nut 103.

The general operation is as follows: Bundles are thrown upon the carrier in the customary manner and conveyed by the same and carrier 22 to the band-cutter, which, rotating at a high speed, acts to straighten out bundles longitudinally upon the carrier and at the same time severs the band and aids the carrier in forcing the mass of grain upward in the direction indicated by the arrow $a$, Fig. 2. As long as the proper speed of the cylinder continues and no overcharge of feed occurs the gate 80 stands in substantially the position shown in dotted lines, Fig. 3, and permits the slowly-rotating retarder and rapidly-rotating feed-cylinder to act upon the grain, the arms of the former projecting up into the mass of grain from below and the path of the latter from above. The effect of this arrangement is to cause the upper portions of the grain to be moved at a much greater speed than the lower and to be stripped and dropped down upon the cylinder below at a point some distance above the concave, which, giving the latter action upon the grain for a greater distance than is customary, results naturally in a more thorough and efficient threshing of the grain. In case the speed of the cylinder should fall below that which is necessary for efficient operation the governor operates, as hereinbefore stated, to stop the movement of the carrier, and likewise should an overcharge of feed take place the lever 93 is automatically turned in the path of dog-arm 74 to stop the carrier. When it is necessary to obtain access to the cylinder, it is easily accomplished by turning the handle 16 in the direction indicated by the arrow, Fig. 7, about a quarter of a circle, thereby withdrawing rods 18 from the holes or recesses 20 and permitting board 13 to be lifted from position to get quick and convenient access to the cylinder. The feed-board can be easily restored to position.

To provide entrance for tailings from the threshing-machines, the cylinder-head 104 is formed concave, while casting 105 forms a spout to receive the tailings and distribute them into a threshing-machine.

106 is a pin carrying a belt-tightener pulley 107, and 108 is an oil-cup for the same.

109 is a casting carrying the pin 106.

110 is the base or belt-tightener support in which the casting 109 is moved, by means of the hand-wheel 111, on the threaded rod 112, which works in the fixed nut 113. The extreme inner end of the bolt 112 comes in contact with casting 109, whereby the latter may be moved forward as said hand-wheel is revolved, (the tension of the belt moving it backward.)

115 represents sheet-iron guards on each side of the entrance to the mouth of the feeder.

116 is the division-board; 117, the cross-support arranged at the hinge-joint of the carrier.

118 is a supporting-rod secured to the division-board 116 and to the frame of the feeder, where it is hinged, as at 120.

119 is a rod connected to the division-board at 121 for raising and swinging said board upward out of the way, as indicated in dotted lines in Fig. 1.

From the above description it will be apparent that I have produced a self-feeder for threshing-machines embodying the features of advantage enumerated as desirable in the statement of invention, and it is to be understood, of course, that while I have shown the preferred embodiment of the invention I reserve the right to make such changes in the form, preparation, detail construction and arrangement of the parts as do not involve a departure from the spirit or scope or sacrifice any of the advantages of the appended claims.

What I claim, and desire to secure by Letters Patent, is—

1. In a self-feeder for threshing-machines, the combination with the threshing-cylinder, of a feeder-cylinder journaled immediately above but slightly in advance of the threshing-cylinder and running at a high speed in the same direction as the threshing-cylinder, and a retarder journaled between but in advance of the threshing and feeding cylinders with its teeth operating within the vertical and horizontal planes in which the teeth of the feeding-cylinder operate, and running at a speed lower than and in a direction opposite to that of the threshing and feeder cylinders, to retard the lower part of the mass of straw in passing between the feeder-cylinder and retarder in its progress through the feeder and to comb out and sweep forward the upper part to the threshing-cylinder, which, in conjunction with the retarder, continues the process of separation, spreading the straw endwise instead of sidewise, before the mass reaches the concave.

2. In a self-feeder for threshing-machines, the combination with the carrier, the threshing-cylinder and the feeder-cylinder journaled above and slightly in advance of the threshing-cylinder, of means for automatically regulating the rate of feed of the carrier independently of the threshing-cylinder, and an adjustable revoluble retarder journaled independently of and in advance of the carrier in a line between the feeder-cylinder and the threshing-cylinder.

3. In a self-feeder for threshing-machines, the combination with the carrier, the threshing-cylinder, and the feeder-cylinder, of means for regulating the rate of feed of the carrier, a revoluble retarder mounted independently of and in advance of the carrier in a position to have the straw pass above it, and means for raising and lowering both ends of the retarder simultaneously while the same is in motion.

4. In a self-feeder for threshing-machines, the combination with the carrier and the threshing-cylinder, of the revoluble retarder mounted independently of and in advance of the carrier in a position to have the straw pass above it, and guards for clearing the same, of means for regulating the rate of feed of the carrier, and means for raising and lowering both ends of said retarder and guards simultaneously.

5. In a self-feeder for threshing-machines, the combination with a threshing-cylinder, of a revoluble feeder-cylinder provided with a tailing entrance through the head thereof and located above the threshing-cylinder to deliver the tailings fed through the opening in the head, onto the threshing-cylinder.

6. In a self-feeder for threshing-machines, the combination with the fixed carrier-shaft, of a pair of castings, each journaled on one end of the shaft, a retarder journaled at each end in one of the free ends of the castings in a position to have the straw pass above it, means connecting the carrier-shaft and the retarder to operate said retarder from the carrier-shaft, a rack and pinion on each side of the machine, a shaft connecting both pinions, an operating-handle secured to one of said pinions, and rods connecting said castings to said racks.

7. The combination with a feeding-cylinder, and a governor connected therewith, of a cutter-shaft, a carrier-shaft, connection between the cutter-shaft and the carrier-shaft for communicating motion from the cutter-shaft to the carrier-shaft, a clutch in said connection, and a connection between the governor and the clutch.

8. In a self-feeder for threshing-machines, the combination with a carrier-shaft, mechanism for operating the same, and a feeder-cylinder mounted in advance of the threshing-cylinder shaft, of means operated by the material when an overcharge is on the carrier, to make the carrier-shaft inoperative; and means operated by the movement of the feed-cylinder to control the movement of the carrier-shaft.

9. In a self-feeder for threshing-machines, an endless carrier, a shaft to operate the carrier, a driven roller, a carrying-disk journaled upon said shaft, a collar secured to the shaft, a dog pivoted to the collar and provided with an arm, a spring to hold said arm in the path of the rollers, of said disk, a rock-shaft provided at one end with an upwardly-projecting crank-arm and at its opposite end with a depending crank-arm provided with a depending gate, a lever 93 fulcrumed as at 94 on the machine-frame, and having its lower end adapted to be thrown in the path of the dog to throw the latter out of gear with the disk, and provided with a longitudinal slot in its upper end, a pin 91 extending through said slot and engaging the upwardly-projecting crank-arm, a rod 86 secured at one end to the frame and extending through the other crank of the gate-carrying shaft, a nut 87 upon the free end of said rod and a spring 89 upon the rod and pressing at its opposite ends against the end of the said crank, all arranged substantially as described.

10. In a self-feeder for threshing-machines, a suitable frame provided with elongated grooves in its inner sides, a feed-board fitting down upon the concave snugly between said sides and provided with plates embracing the opposite sides of the concave and extending in the same direction as said recesses, a cross-bar secured to the upper end of said feed-board and provided with longitudinal grooves 19 registering with the grooves of the frame, a plate secured to said board, and a pair of slide-rods pivoted to said disk at diametrically opposite points and extending through said grooves with their outer ends adapted to engage the said recesses of the frame, substantially as described.

The foregoing specification signed this 20th day of August, 1901.

DAVID C. RUTH.

In presence of—
W. J. SLOAN,
J. B. SEHMANN.